(12) United States Patent
Chen et al.

(10) Patent No.: US 7,030,992 B2
(45) Date of Patent: Apr. 18, 2006

(54) DUAL MODE FIBER-OPTIC INTERFEROMETER WITH CIRCULAR-CORE FIBERS AND BIREFRINGENT MODAL FILTERS AND AN INTERFERING METHOD THEREOF

(76) Inventors: Tien-Jung Chen, No. 21, Alley 2, Lane 51, Fu-Te St., Hsin-Yi District, Taipei (TW) 110; Shu-Hsia Chen, No. 86, 20-3, Ta Hsueh Rd., Hsinchu (TW) 300

(*) Notice: Subject to any disclaimer, the term of this patent is extended or adjusted under 35 U.S.C. 154(b) by 293 days.

(21) Appl. No.: 10/447,623

(22) Filed: May 29, 2003

(65) Prior Publication Data
US 2003/0223074 A1   Dec. 4, 2003

(30) Foreign Application Priority Data
May 31, 2002   (TW) ............... 91111785 A (51) Int. Cl.
*G01B 9/02*   (2006.01)
(52) U.S. Cl. ............................ 356/477; 356/491
(58) Field of Classification Search ............ 356/477, 356/478, 491; 385/12, 13; 250/227.17, 250/227.19, 227.27
See application file for complete search history.

(56) References Cited
U.S. PATENT DOCUMENTS
5,586,205 A * 12/1996 Chen et al. ............... 385/29

OTHER PUBLICATIONS

B.Y. Kim, J.N. Blake, S.Y.Huang, and H. J. Shaw, "Use of Highly Elliptical Core for Two-Mode Fiber Devices", Sep. 1987, Optics Letters, vol. 12, No. 9, pp. 729-731.*

K. Bohnert, G. de Wit, and J. Nehring, "Interrogation of a Remote Elliptical -Core Dual-Mode Fiber Strain Sensor by Using a Tandem Interferometer Configuration", May 1992, Optics Letters, vol. 17, No. 9, p. 694.*

(Continued)

Primary Examiner—Samuel A. Turner
Assistant Examiner—Patrick Connolly
(74) Attorney, Agent, or Firm—The Webb Law Firm (57) ABSTRACT

A fiber-optic interferometer is provided. The interferometer includes a first dual-mode optical fiber for receiving a light input and exciting a first and a second spatial, modes, a first modal processor connected to the first dual-mode optical fiber for selecting the first and the second spatial modes, a second dual-mode optical fiber connected to the first modal processor for propagating the first and the second spatial modes and producing a phase shift ($\Delta\phi$) between the first and the second spatial modes in response to an external perturbation effect, a second modal processor connected to the second dual-mode optical fiber for re-selecting the first and the second spatial modes and producing a first light output interference pattern, and an analyzer connected to the second modal filter for adjusting the first light output interference pattern to produce a second light output interference pattern.

25 Claims, 8 Drawing Sheets

OTHER PUBLICATIONS

W.V. Sorin, B.Y. Kim, and H.J. Shaw, "Highly Selective Evanescent Modal Filter for Two-Mode Optical Fibers", Sep. 1986, Optics Letters, vol. 11, No. 9, p. 581.*

Tien-Jung Chen, "Use of liquid-crystal-clad fiber as a modal filter for a two-mode fiber-optic interferometer", Dec. 2004, Optics Letters, vol. 29, No. 24, p. 2852.*

* cited by examiner

DUAL MODE FIBER-OPTIC INTERFEROMETER WITH CIRCULAR-CORE FIBERS AND BIREFRINGENT MODAL FILTERS AND AN INTERFERING METHOD THEREOF

FIELD OF THE INVENTION

This invention relates to an interferometer and an interfering method thereof, and more particular to a fiber-optic interferometer and an interfering method thereof.

BACKGROUND OF THE INVENTION

Generally, the interfering-type interferometer developed in the laboratory is constructed on the Mach-Zehnder interferometer and the transmission paths thereof are substituted by the optical fibers. When there exists an external perturbation, such as the variation of temperature or pressure, it will cause a variation of a phase retardation ($\Delta\phi$), namely $\Delta\phi(T)$ or $\Delta\phi(P)$, and appear a variation in an interference-intensity distribution. This is the basic mechanism for measuring the interference.

When the interferometer is constructed by employing the optical fibers, there are two ways: one is using two single-mode fibers, and the other is only utilizing one dual-mode fiber. The most obvious advantages for using only one fiber are small volume, deflectable, and high stability. In the interferometer employing single dual-mode optical fiber, the signal beam and the reference beam in the prior arts are respectively substituted by a fundamental mode and a second-order mode. Thus, the two modes will transmit in one optical fiber and travel an identical distance, and even if the coherent length of a light source is shorter, the interference will not be influenced. On the contrary, in the two-fiber interferometer, it needs to consider the coherent length of the light source, namely the difference of the traveling routes of the beams in two fibers should be within the coherent length, so that the limitations of the optical paths and the spectrum characteristic are increased.

Figure 1:
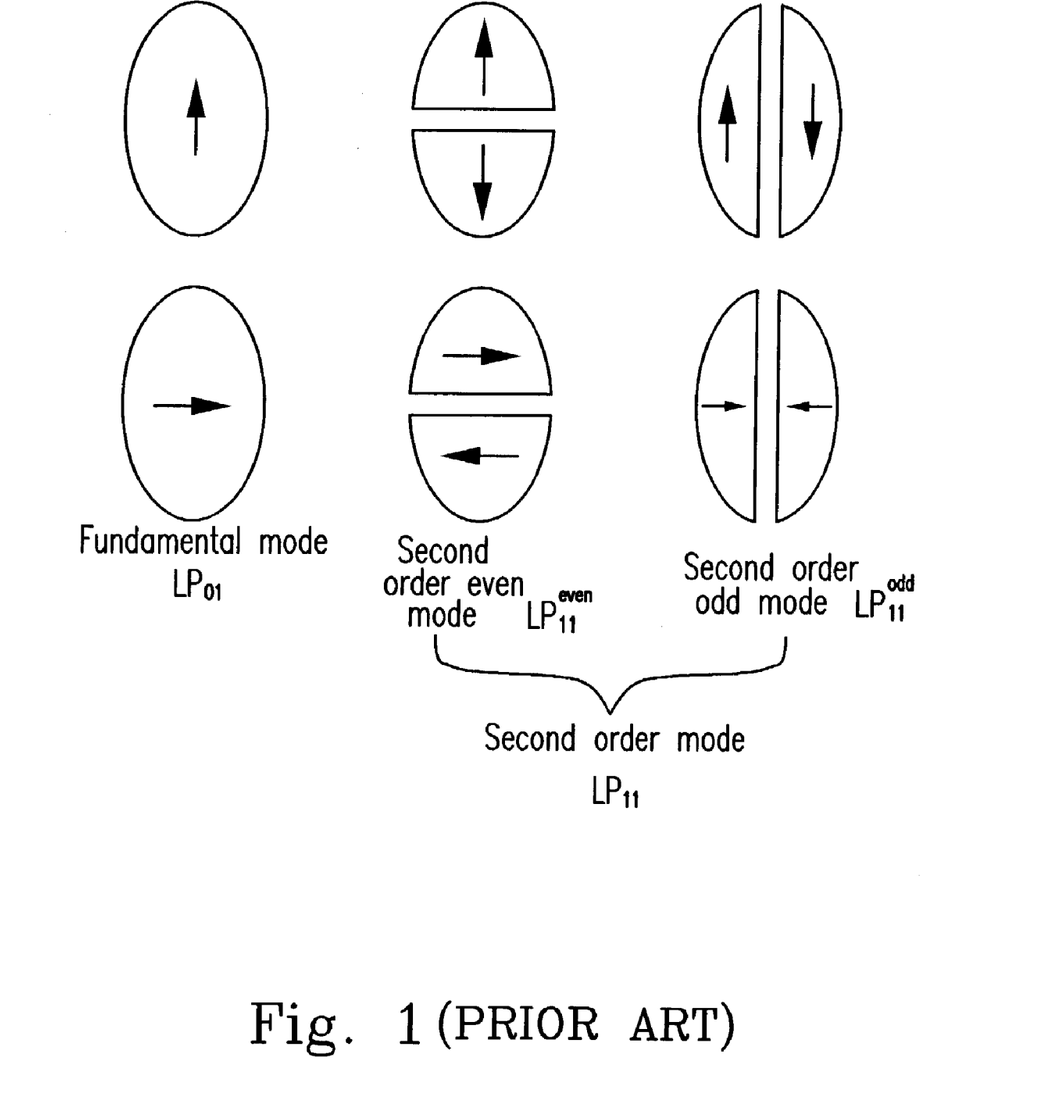
FIG. 1 shows an energy distribution drawings of the fundamental mode and the second-order mode in an e-core fiber in the prior arts.
Figure 2:
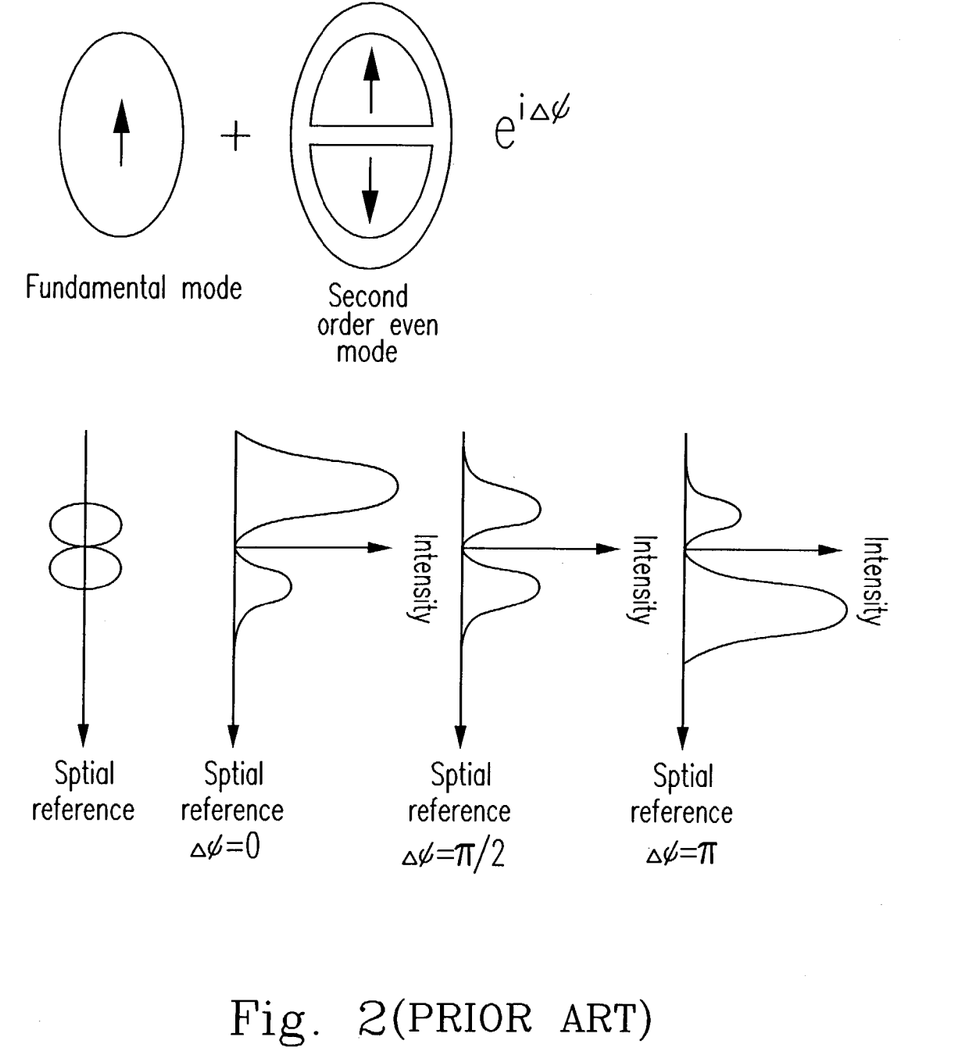
FIG. 2 shows the evolution of the interference pattern in response to the variation of the phase shift ($\Delta\phi$) of the fundamental mode and the second-order even mode in the prior arts.

The interferometer which is constructed on the dual-mode optical fiber utilizes the fundamental mode to interfere with a second-order mode. Because the second-order mode group has four eigenmodes and is hard to be excited with a single second-order mode, it causes an unstable interference pattern. Thus, an e-core optical fiber has been proposed. The dual-mode optical fiber in this structure includes the fundamental mode ($LP_{01}$) and the second-order mode group ($LP_{11}$), as shown in FIG. 1. In the general o-core (circular-core) fiber, the second-order mode group cannot be separated easily. But, in this e-core fiber, a second-order even mode ($LP_{11}^{even}$) and a second-order odd mode ($LP_{11}^{odd}$) have different cutoff wavelengths. Thus, through selecting an appropriate wavelength, these two can be separated, and the fundamental mode and the second-order even mode can be excited sufficiently. Also, through the different phase retardation ($\Delta\phi$) between the fundamental mode and the second-order even mode, the output interference pattern will be appeared in a different way (the theory is shown in FIG. 2). Basically, the output pattern is two lobes which will mutually rise and fall in response to the difference of the phase retardation, and furthermore, through measuring the contrast intensity of the two lobes, the phase retardation can be quantitated. In this structure, the main difficulties are that the e-core fiber is expensive, and the polarized direction of the incident light should be aligned with the major (or minor) axis of the e-core, or it will cause the propagated light to have an elliptical polarization so as to reduce the visibility of the variation of the interference pattern from the superposition of the fundamental mode and the second-order even mode. Thus, it includes the defect of aligning hardly. Please again refer to FIG. 2 illustrating the theory, one can find that the visibility of variation of the two-lobe pattern is also relative to the energy ratio of the fundamental mode and the second-order even mode. If the energy of the two modes can be distributed appropriately, when the phase retardation ($\Delta\phi$)=0 and $\pi$, one lobe will totally be destroyed and the other will be completely constructed. Thus, according to the variation of the phase retardation, the rise and fall of the two lobes can show an optimal contrast variation. However, because the excited energy of the two modes in the e-core fiber cannot be controlled easily, the visibility is also hard to control.

Because of the technical defects described above, the applicant keeps on carving unflaggingly to develop "a dual-mode fiber-optic interferometer with circular-core fibers and birefringent modal filters and an interfering method thereof" through wholehearted experience and research.

SUMMARY OF THE INVENTION

It is an object of the present invention to provide a fiber-optic interferometer and an interfering method thereof.

It is another object of the present invention to provide a fiber-optic interferometer which employs a modal filter for selecting a fundamental mode and a second-order mode and proceeding an interference.

It is a further object of the present invention to provide an interferometer which owns the advantages of low cost, easy aligning, and adjustable visibility.

It is an additional object of the present invention to provide a fiber-optic interferometer which includes a first dual-mode optical fiber for receiving a light input and exciting a first spatial mode and a second spatial mode, a first modal processor connected to the first dual-mode optical fiber for selecting the first spatial mode and the second spatial mode, a second dual-mode optical fiber connected to the first modal processor for propagating the first spatial mode and the second spatial mode and producing a phase shift ($\Delta\phi$) between the first spatial mode and the second spatial mode in response to an external perturbation effect, a second modal processor connected to the second dual-mode optical fiber for re-selecting the first spatial mode and the second spatial mode and producing a first light output interference pattern, and an analyzer having a polarization axis and connected to the second modal filter for adjusting the first light output interference pattern to produce a second light output interference pattern, so that the second light output interference pattern obtains an optimal contrast (C) through an adjustment of the polarization axis.

Preferably, the interferometer further includes a charge coupled device (CCD) connected to the analyzer for detecting and transforming the second light output interference pattern to be a current signal, an image picking-up and analyzing device connected to the charge coupled device for picking-up illuminations of the second light output interference patterns of the first and the second spatial modes to calculate the phase shift thereof.

Preferably, the image picking-up and analyzing device picks-up illuminations $I_q$ and $I_{q'}$ of the second light output interference pattern at two specific positions, which are two local brightest positions for the second spatial mode, for being calculated to obtain the contrast $$C \equiv \frac{I_q - I_{q'}}{I_q + I_{q'}}$$

so as to obtain the phase shift ($\Delta\phi$) of the first and the second spatial modes, wherein the contrast has a direct proportion to cos ($\Delta\phi$).

Preferably, the contrast is optimal and equal to cos ($\Delta\phi$) when the polarization axis of the analyzer is adjusted to a specific angle, and the specific angle is deviated from the polarized direction of the first spatial mode and has a magnitude of $\cos^{-1}(1/1.12M)$, wherein $M^2$ is an energy ratio of the first and the second spatial modes before passing through the analyzer.

Preferably, the interferometer further includes a polarization axis rotatory driver connected to the image picking-up and analyzing device for rotating the polarization axis.

Preferably, the first dual-mode optical fiber is an o-core dual-mode optical fiber and has a parameter $V = (2\pi a/\lambda) \times \sqrt{N_{co}^2 - N_{cl}^2}$ ranged from 2.45 to 3.8, wherein a is a core radius, $\lambda$ is a light wavelength, $N_{co}$ is a refractive index of the core, and $N_{cl}$ is a refractive index of a cladding thereof.

Preferably, the first dual-mode optical fiber further excites a third spatial mode and a fourth spatial mode, and the first spatial mode is $HE_{11}$ mode and the second spatial mode is $TE_{01}$ mode, and the $HE_{11}$ mode is a fundamental mode and the $TE_{01}$ is a second-order mode.

Preferably, the light input has an energy distribution more matchable with the first spatial mode and thereby excites the first spatial mode to have an energy significantly greater than other modes when incident upon the first dual-mode optical fiber.

Preferably, the first modal processor is capable of filtering the third and the fourth spatial modes, and the third spatial mode is $TM_{01}$ mode and the fourth spatial mode is $HE_{21}$ mode.

Preferably, the first modal processor includes a first modal-filter dual-mode fiber which is an o-core dual-mode optical fiber and has a fiber core and a cladding layer, wherein the cladding layer partially includes a radially birefringent material so as to provide a fiber section coated thereby to own functions of selecting the second spatial mode, filtering the third and the fourth spatial modes, and attenuating the first spatial mode. The radially birefringent material is a liquid crystal having molecules longitudinally arranged at a diametric direction of the first modal-filter dual-mode fiber.

Preferably, the second modal processor is capable of filtering the third spatial mode and the fourth spatial mode.

Preferably, the second modal processor includes a second modal-filter dual-mode fiber which is an o-core dual-mode optical fiber and has a fiber core and a cladding layer, wherein the cladding layer partially includes a radially birefringent material so as to provide a fiber section coated thereby to own functions of selecting the second spatial mode, filtering the third and the fourth spatial modes, and attenuating the first spatial mode. Furthermore, the radially birefringent material is a liquid crystal having molecules longitudinally arranged at a diametric direction of the second modal-filter dual-mode fiber.

Preferably, the polarization axis is directionally adjustable for controlling an energy ratio of the first and the second spatial modes after passing through the analyzer.

In accordance with an aspect of the present invention, an optical fiber interfering method for a fiber-optic interferometer includes steps of: providing a light, exciting a first spatial mode and a second spatial mode in response to the light, selecting and propagating the first and the second spatial modes through an environment having an external perturbation, producing a phase shift of the first and the second spatial modes in response to the external perturbation and producing a first light output interference pattern; adjusting the first light output interference pattern for producing a second light output interference pattern having an optimal contrast (C), and detecting the optimal contrast of the second light output interference pattern for obtaining the phase shift of the first and the second spatial modes.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

Figure 3A:
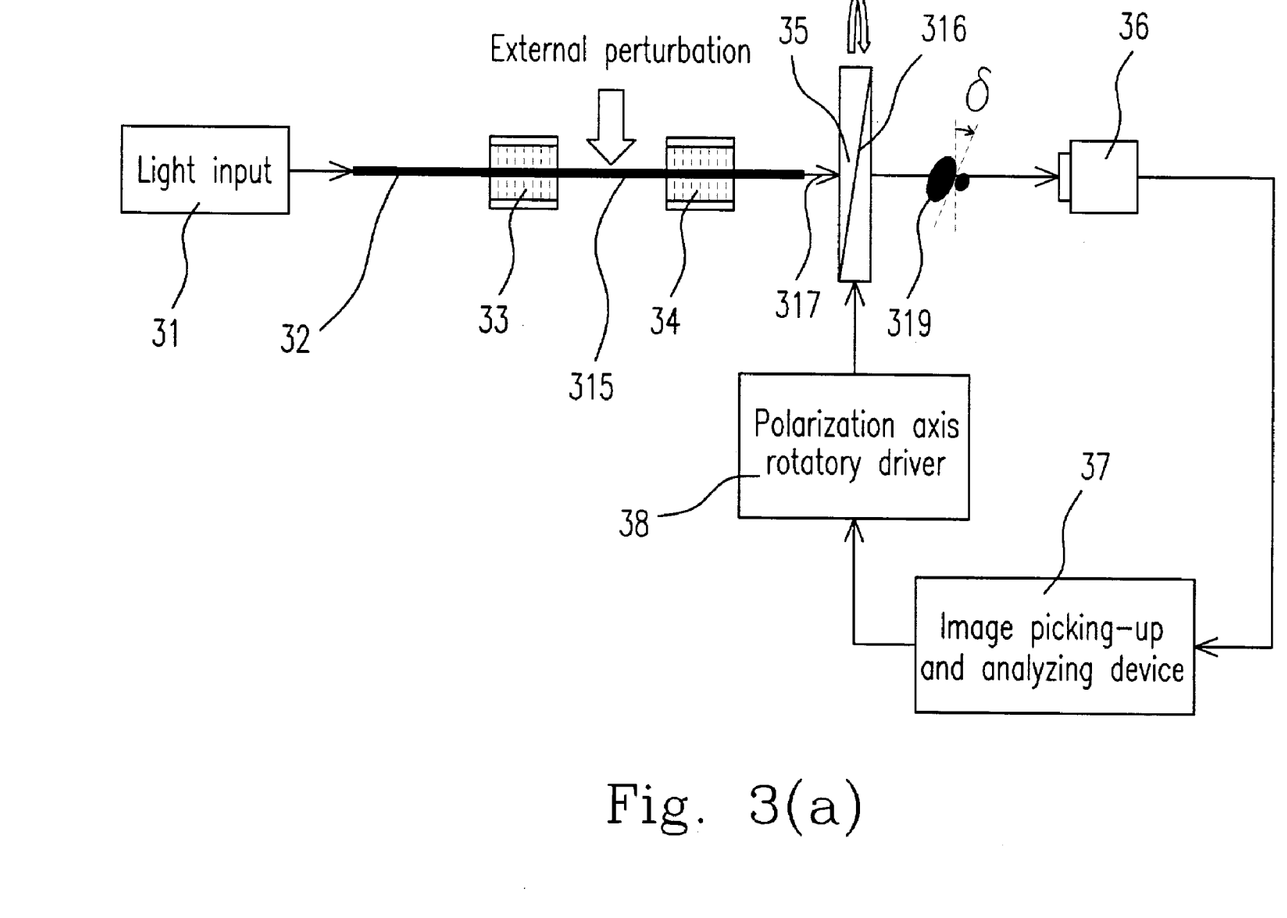
FIG. 3(a) shows a structural schematic view in a preferred embodiment according to the present invention.

Please refer to FIG. 3(a) which illustrates the structural schematic view in a preferred embodiment according to the present invention. The structure includes a light input 31, a first dual-mode optical fiber 32, a first modal filter 33, a second dual-mode optical fiber 315, a second modal filter 34, an analyzer 35, a charge coupled device (CCD) 36, a image picking-up and analyzing device 37, and a polarization axis rotatory driver 38, wherein the analyzer 35 includes a polarization axis 316.

When the light input 31 is incident into the first dual-mode optical fiber 32, the $HE_{11}$, $TE_{01}$, $TM_{01}$, and $HE_{21}$ modes (all are not shown) will be excited, wherein the $HE_{11}$ is a fundamental mode and the others are second-order modes. Moreover, when all these modes are propagated to the first modal filter 33, the $TM_{01}$ and the $HE_{21}$ will be filtered, the $HE_{11}$ will be attenuated, and the $TE_{01}$ will remain the same. Thus, the comparison of the attenuation ratio is $TM_{01}$ and $HE_{21} \gg HE_{11} > TE_{01}$. Because, in the present invention, the light input 31 adopts Gauss beam excitation, the energy of the $HE_{11}$ mode is significantly greater than that of the $TE_{01}$ mode. Therefore, even if the $HE_{11}$ mode is attenuated after the first modal filter 33, the energy of the $HE_{11}$ mode can still remain greater than that of the $TE_{01}$ mode. Among these, the first dual-mode optical fiber 32 is an o-core dual-mode optical fiber having a parameter $V=(2\pi a/\lambda)\times\sqrt{N_{co}^2-N_{cl}^2}$ ranged from 2.45 to 3.8, wherein a is a core radius, $\lambda$ is a light wavelength, $N_{co}$ is a refractive index of the core, and $N_{cl}$ is a refractive index of a cladding layer thereof.

The two modes ($HE_{11}$ and $TE_{01}$) are equivalent to the two transmission paths in the traditional interferometer. When the two modes propagate through the second dual-mode optical fiber 315, it will cause the phase retardation ($\Delta\phi$) between those two modes because sensing the external perturbation (e.g, temperature and pressure). Furthermore, the second modal filter 34 will re-filter the $TM_{01}$ and the $HE_{21}$ modes to produce a first light output interference pattern 317, wherein the first light output interference pattern 317 will be different in response to the difference of the phase retardation. In addition, the analyzer 35 is employed to adjust the first light output interference pattern and produce a second light output interference pattern 319. Furthermore, the analyzer 35 can control the energy ratio of the $HE_{11}$ and $TE_{01}$ modes for obtaining an optimal contrast of the second light output interference pattern 319 through adjusting the polarization axis 316 in the analyzer 35. The polarization axis 316 has an optimal angle determined by the experiment which is theoretically relative to the energy ratio of the $HE_{11}$ and the $TE_{01}$.

Figure 3B:
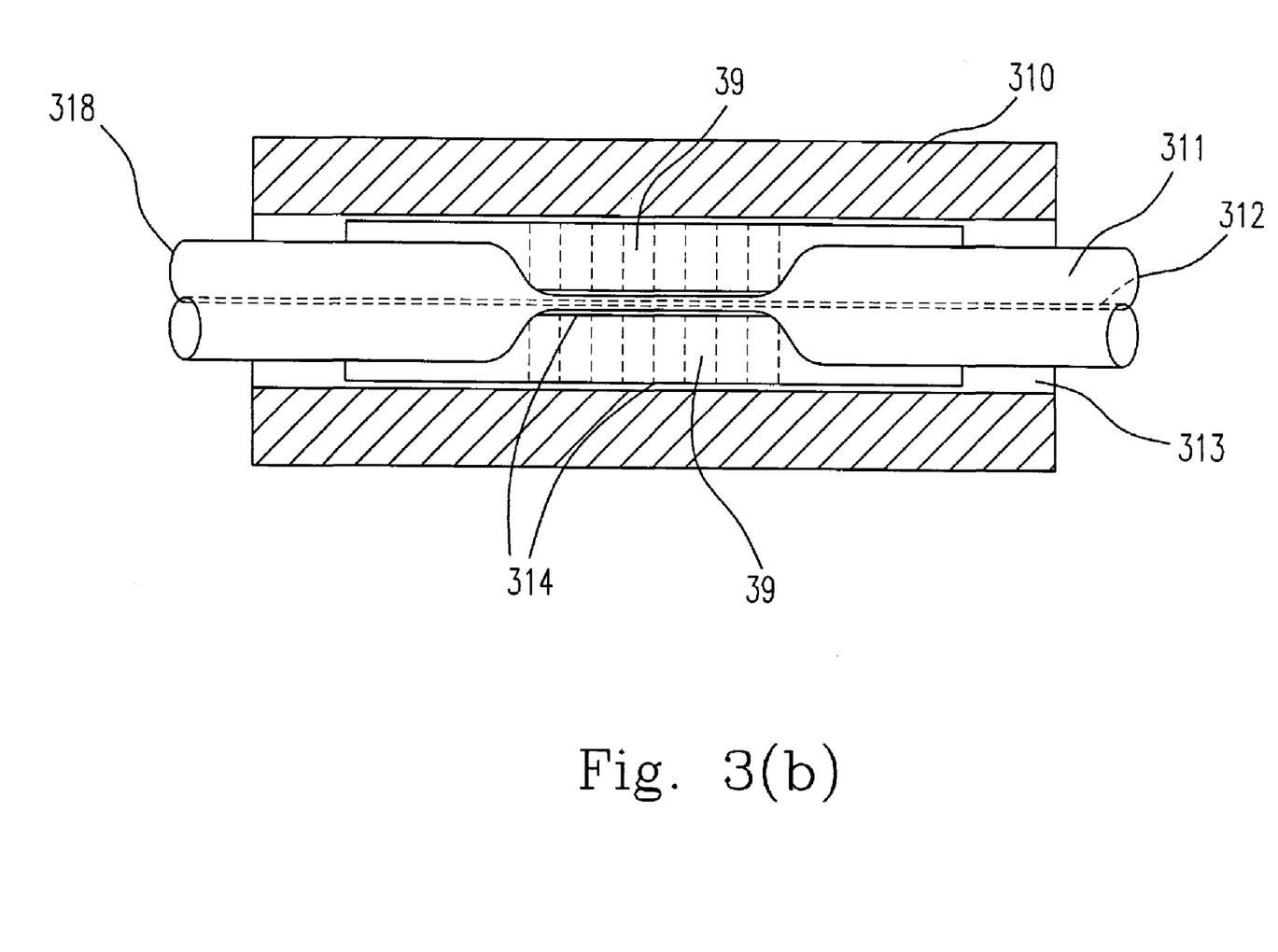
FIG. 3(b) shows a side view of a modal filter used in a preferred embodiment according to the present invention.
Figure 3C:
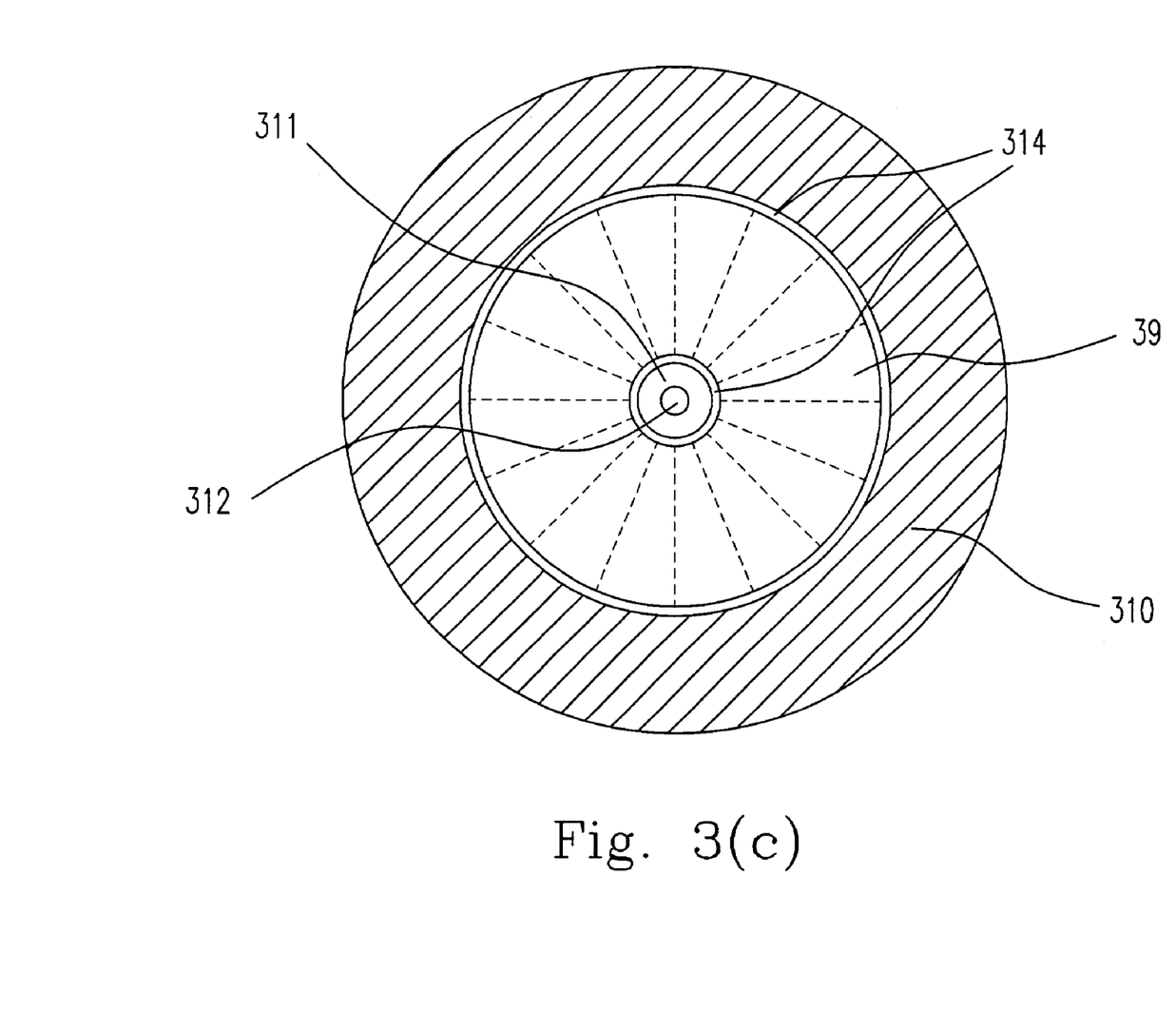
FIG. 3(c) shows a cross-sectional view of a modal filter used in a preferred embodiment according to the present invention.

The side view and cross-sectional view of the first modal filter 33 and the second modal filter 34 are illustrated in FIGS. 3(b) and 3(c). The modal filter includes a modal-filter dual-mode optical fiber 318 which has a fiber core 312 and a cladding layer 311, wherein the cladding layer 311 is partially replaced by a radially birefringent material 39 so as to provide a fiber section coated thereby to own functions of selecting the $TE_{01}$, filtering the $TM_{01}$ and the $HE_{21}$, and attenuating $HE_{11}$. And, the radially birefringent material 39 is a liquid crystal which has molecules longitudinally arranged at a diametric direction. As shown in FIGS. 3(b)~3(c), the aligning material 314 is a perpendicular alignment agent for providing an arranging direction to the liquid crystal molecules. Besides, the modal-filter dual-mode optical fiber 318 is passed through the protective tube 310, and an epoxy resin 313 is utilized to seal the interval between the two ends of the protective tube 310 and the modal-filter dual-mode optical fiber 318 for fixing the modal-filter dual-mode optical fiber 318.

The fiber-optic interferometer described above further includes a charge coupled device (CCD) 36 for detecting the second light output interference pattern 319 and transforming thereof into a current signal, an image picking-up and analyzing device 37 for picking-up illuminations of the second light output interference patterns 319 of the $HE_{11}$ and $TE_{01}$ modes to calculate the phase retardation thereof, and a polarization axis rotatory driver 38 for rotating the polarization axis 316.

Figure 4:
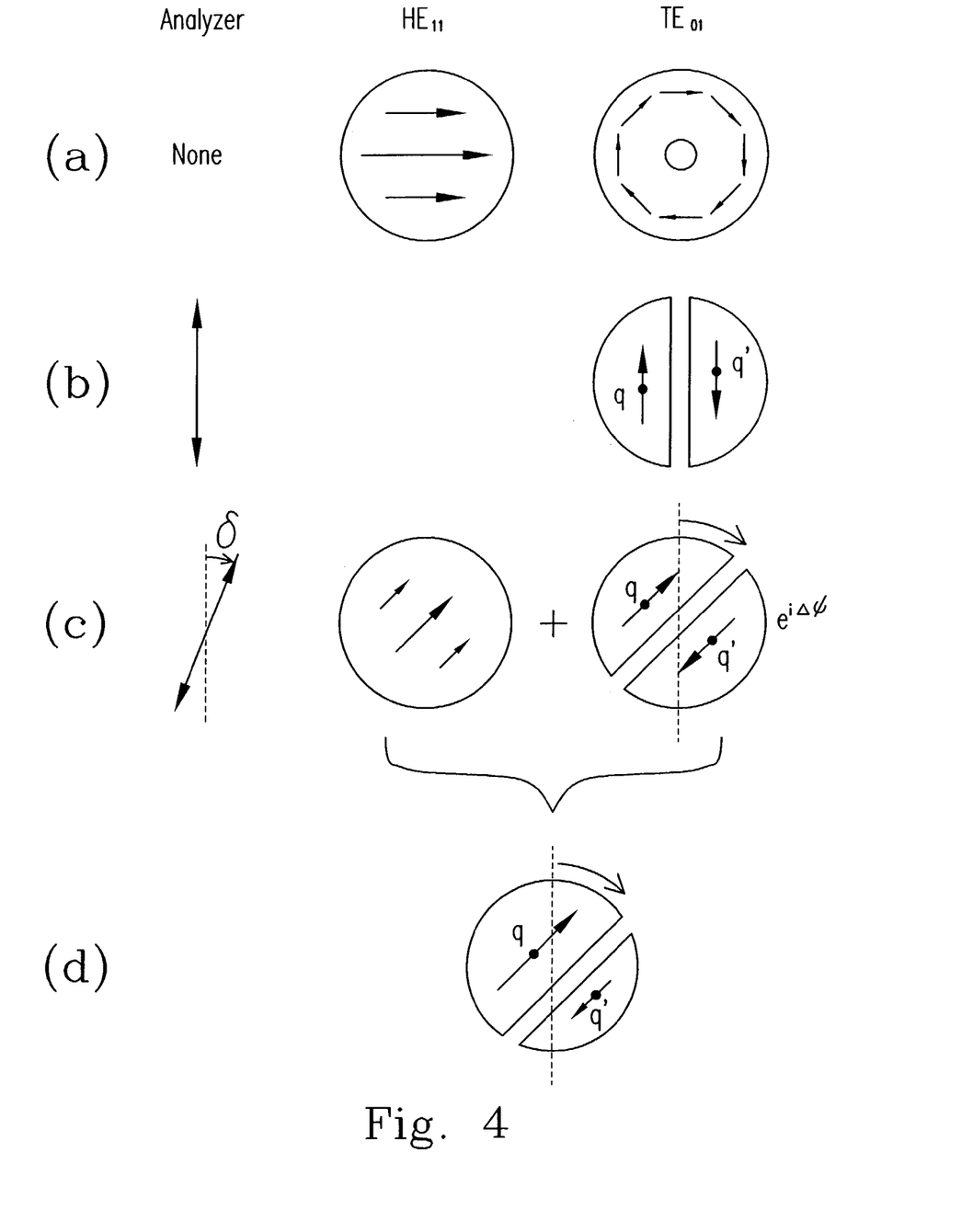
FIG. 4 shows a second output interference pattern of a fundamental mode $HE_{11}$ and a second-order mode $TE_{01}$ when an analyzer have a rotation angle of $\delta$ in a preferred embodiment according to the present invention.

Please refer to FIG. 4 which illustrates the second light output interference pattern of the $HE_{11}$ and $TE_{01}$ modes when the analyzer has a rotated angle of $\delta$. The electric field polarization of the $HE_{11}$ and $TE_{01}$ modes is shown in FIG. 4(a), wherein the energy ratio thereof is $M^2$. After passing the analyzer 35, the $HE_{11}$ mode will be completely attenuated because the direction of electric field polarization of the $HE_{11}$ mode is perpendicular to the polarization axis 316 in the analyzer 35, and the energy of the $TE_{01}$ mode will be half attenuated. Furthermore, the optical pattern of the $TE_{01}$ mode is two lobes with a null line parallel to the polarization axis, and each of the two lobes respectively has a position q and q' where appearing the maximum illumination, as shown in FIG. 4(b). With the rotation of the polarization axis 316 in the analyzer 35, the energy of the $HE_{11}$ mode will be adjusted, and however, the energy of the $TE_{01}$ mode will still remain the same. In addition, the null line of the two lobes is rotated in response to the polarization axis 316, and the positions q and q' where appearing the maximum illumination in the two lobes will also be rotated, as shown in FIG. 4(c). Then, the interfered light intensity of the $HE_{11}$ and $TE_{01}$ modes at the positions q and q' will be selected for defining a contrast $$C \equiv \frac{I_q - I_{q'}}{I_q + I_{q'}},$$

as shown in FIG. 4(d). Through measuring the contrast C, the phase retardation $\Delta\phi$ of the $TE_{01}$ and the $HE_{11}$ can be obtained.

Figure 5:
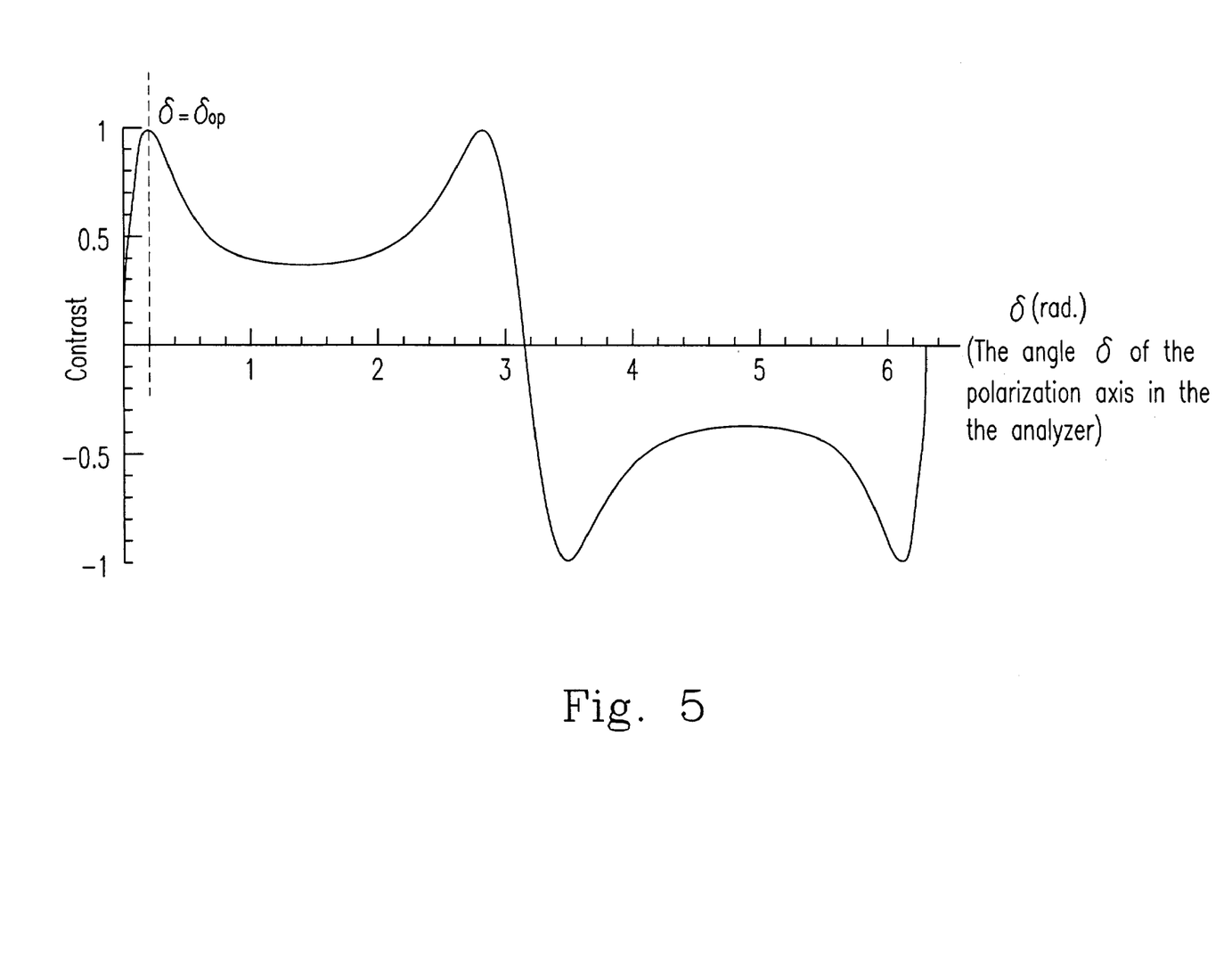
FIG. 5 shows the plot of a contrast vs. an angle of the analyzer in a preferred embodiment according to the present invention.

Theoretically, it is known that $$C = \frac{2(1.12M\sin\delta)}{1+(1.12M\sin\delta)^2}\cos(\Delta\phi),$$

wherein $M^2$ is an energy ratio of the $HE_{11}$ and $TE_{01}$ modes before passing through the analyzer 35, $\delta$ is the angle of the polarization axis 316 in the analyzer 35, the contrast has a direct proportion to $\cos(\Delta\phi)$, and $\Delta\phi$ is the phase retardation of the $TE_{01}$ and $HE_{11}$ modes. Also, if taking the polarized direction of the $HE_{11}$ mode as a reference direction, the deviated angle of the polarization axis 316 in the analyzer 35 from the reference direction will be $90°-\delta$. The plot of the contrast C and the angle $\delta$ of the polarization axis 316 in the analyzer 35 is shown in FIG. 5. In FIG. 5, it can be seen that when $\delta$ is positioned at an optimal angle $\delta_{op}$, an optimal contrast can be obtained, and when $\delta$ is deviated from $\delta_{op}$, the contrast will obviously be lowered down. Theoretically, $\delta_{op}=\sin^{-1}(1/1.12M)$.

Figure 6:
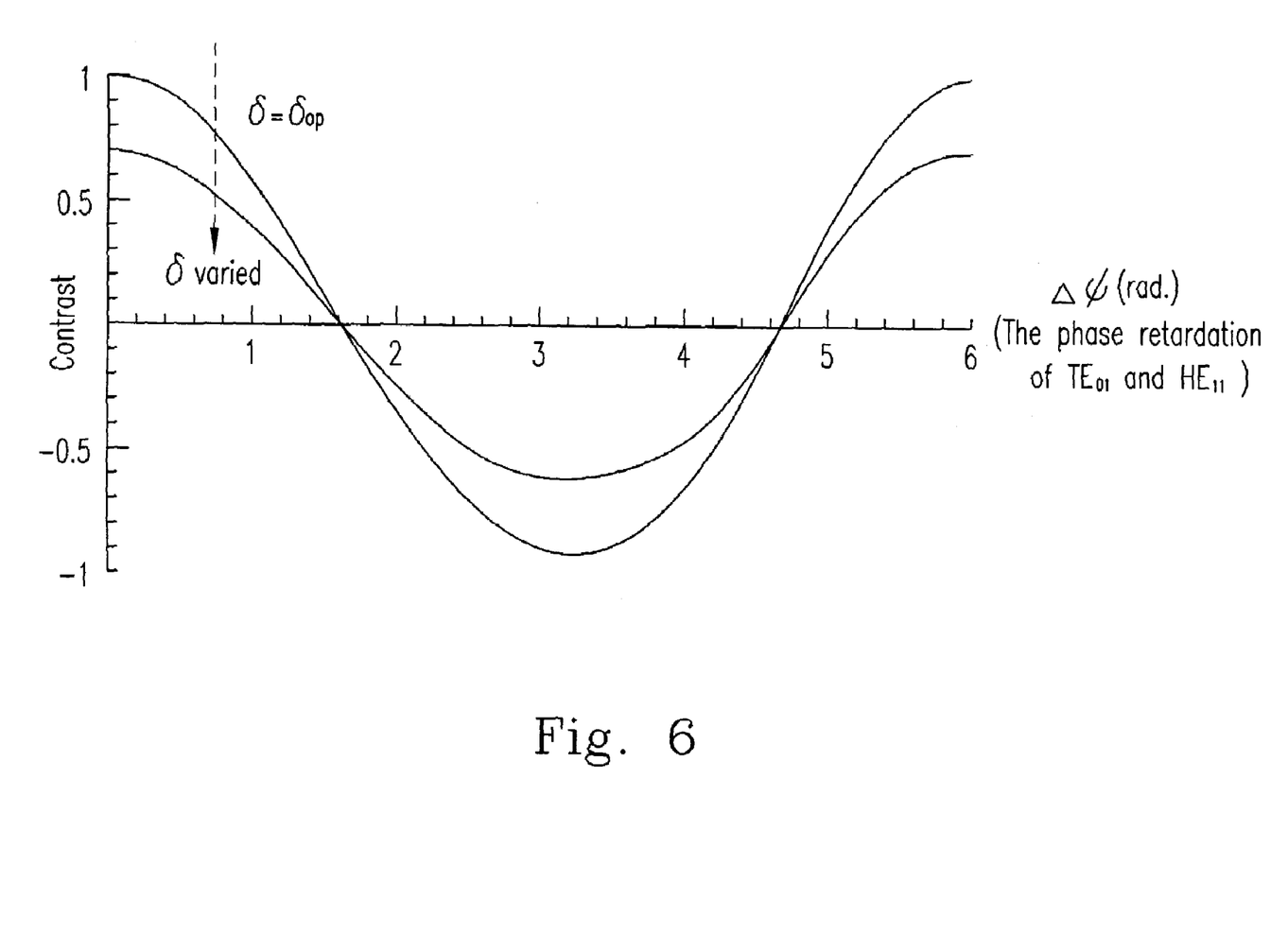
FIG. 6 shows the plot of the contrast vs. the phase retardation between the $HE_{11}$ and the $TE_{01}$ in a preferred embodiment according to the present invention.

The plot of the contrast C and the phase retardation ($\Delta\phi$) of the $TE_{01}$ and $HE_{11}$ modes is shown in FIG. 6. Through measuring the illumination of the second light output interference pattern 319, one can obtain the phase retardation $\Delta\phi$ of the $TE_{01}$ and the $HE_{11}$ which is caused by the external perturbation effect so as to realize the level of the environmental disturbance. When the polarization axis 316 in the analyzer 35 is adjusted to be of the angle $\delta_{op}$, the sensitivity of the variation of the contrast corresponding to the phase retardation of the $TE_{01}$ and $HE_{11}$ modes will be the greatest. However, when $\delta$ is deviated from $\delta_{op}$, the sensitivity of the variation of the contrast corresponding to the phase retardation of the $TE_{01}$ and $HE_{11}$ modes will be lowered down. Among these, the variation of the contrast will be optimal when the polarization axis is adjusted to a specific angle, and if using the polarized direction of the $HE_{11}$ mode as a reference direction, the specific angle will be deviated from the polarized direction of the $HE_{11}$ mode and has a magnitude of $\cos^{-1}(1/1.12M)$, wherein $M^2$ is the energy ratio of the $HE_{11}$ and $TE_{01}$ modes before passing through the analyzer 35, and the detected contrast is equal to $\cos(\Delta\phi)$.

In view of the aforesaid, the present invention employs the popular o-core dual-mode optical fiber and selects the $HE_{11}$ and $TE_{01}$ modes as two spatial modes through the optical fiber modal filter for proceeding an interference. Except that the price of this kind of optical fiber is cheaper, the present invention avoids the problem of aligning the polarized direction of incident light. Thus, it is easy to align. And, simultaneously, the contrast of the light output interference pattern can be adjusted by the polarization axis in the analyzer so as to obtain the optimal contrast. Therefore, the present invention owns the advantages of low cost, easy aligning, and adjustable contrast. Consequently, the present invention improves the defects in the prior arts and is valuable for the industrial development.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A fiber-optic interferometer, comprising:
   a first dual-mode optical fiber for receiving a light input and exciting a first spatial mode and a second spatial mode;
   a first modal processor connected to said first dual-mode optical fiber for selecting said first spatial mode and said second spatial mode;
   a second dual-mode optical fiber connected to said first modal processor for propagating said first spatial mode and said second spatial mode and producing a phase shift ($\Delta\phi$) between said first spatial mode and said second spatial mode in response to an external perturbation effect;
   a second modal processor connected to said second dual-mode optical fiber for re-selecting said first spatial mode and said second spatial mode and producing a first light output interference pattern; and
   an analyzer having a polarization axis and connected to said second modal processor for adjusting said first light output interference pattern to produce a second light output interference pattern, so that said second light output interference pattern obtains an optimal contrast (C) through an adjustment of said polarization axis.

2. A fiber-optic interferometer according to claim 1 further comprising a charge coupled device (CCD) connected to said analyzer for detecting and transforming said second light output interference pattern to be a current signal.

3. A fiber-optic interferometer according to claim 2 further comprising an image picking-up and analyzing device connected to said charge coupled device for picking-up illuminations of said second light output interference patterns of said first and said second spatial modes to calculate said phase shift thereof.

4. A fiber-optic interferometer according to claim 3, wherein said image picking-up and analyzing device picks-up illuminations $I_q$ and $I_{q'}$ of said second light output interference pattern at two specific positions, which are two local brightest positions for said second spatial mode, for being calculated to obtain said contrast $$C \equiv \frac{I_q - I_{q'}}{I_q + I_{q'}}$$

so as to obtain said phase shift of said first and said second spatial modes.

5. A fiber-optic interferometer according to claim 4, wherein said contrast has a direct proportion to $\cos(\Delta\phi)$.

6. A fiber-optic interferometer according to claim 5, wherein said contrast is optimal and equal to said $\cos(\Delta\phi)$ when said polarization axis is adjusted to a specific angle, and said specific angle is deviated from the polarized direction of said first spatial mode and has a magnitude of $\cos^{-1}(1/1.12M)$, wherein $M^2$ is an energy ratio of said first and said second spatial modes before passing through said analyzer.

7. A fiber-optic interferometer according to claim 3 further comprising a polarization axis rotatory driver connected to said image picking-up and analyzing device for rotating said polarization axis.

8. A fiber-optic interferometer according to claim 1 wherein said first dual-mode optical fiber is an o-core dual-mode optical fiber and has a parameter $V=(2\pi a/\lambda)\times\sqrt{N_{co}^2-N_{cl}^2}$ ranged from 2.45 to 3.8, wherein a is a core radius, $\lambda$ is a light wavelength, $N_{co}$ is a refractive index of said core, and $N_{cl}$ is a refractive index of a cladding thereof.

9. A fiber-optic interferometer according to claim 1 wherein said first dual-mode optical fiber further excites a third spatial mode and a fourth spatial mode.

10. A fiber-optic interferometer according to claim 1 wherein said light input has an energy distribution more matchable with said first spatial mode and thereby excites said first spatial mode to have an energy significantly greater than other modes when incident upon said first dual-mode optical fiber.

11. A fiber-optic interferometer according to claim 1, wherein said first spatial mode is $HE_{11}$ mode and said second spatial mode is $TE_{01}$ mode, and said $HE_{11}$ mode is a fundamental mode and said $TE_{01}$ mode is a second-order mode.

12. A fiber-optic interferometer according to claim 1 wherein said first modal processor is capable of filtering said third and said fourth spatial modes, and said third spatial mode is $TM_{01}$ mode and said fourth spatial mode is $HE_{21}$ mode.

13. A fiber-optic interferometer according to claim 1 wherein said first modal processor includes a first modal-filter dual-mode fiber which is an o-core dual-mode optical fiber and has a fiber core and a cladding layer.

14. A fiber-optic interferometer according to claim 13 wherein said cladding layer partially includes a radially birefringent material so as to provide a fiber section coated thereby to own functions of selecting said second spatial mode, filtering said third and said fourth spatial modes, and attenuating said first spatial mode.

15. A fiber-optic interferometer according to claim 14 wherein said radially birefringent material is a liquid crystal having molecules longitudinally arranged at a diametric direction of said first modal-filter dual-mode fiber.

16. A fiber-optic interferometer according to claim 1 wherein said second modal processor is capable of filtering said third spatial mode and said fourth spatial mode.

17. A fiber-optic interferometer according to claim 1, wherein said second modal processor includes a second modal-filter dual-mode fiber which is an o-core dual-mode optical fiber and has a fiber core and a cladding layer.

18. A fiber-optic interferometer according to claim 17 wherein said cladding layer partially includes a radially birefringent material so as to provide a fiber section coated thereby to own functions of selecting said second spatial mode, filtering said third and said fourth spatial modes, and attenuating said first spatial mode.

19. A fiber-optic interferometer according to claim 18 wherein said radially birefringent material is a liquid crystal having molecules longitudinally arranged at a diametric direction of said second modal-filter dual-mode fiber.

20. A fiber-optic interferometer according to claim 1 wherein said polarization axis is directionally adjustable for controlling an energy ratio of said first and said second spatial modes after passing through said analyzer.

21. A fiber-optic interferometer, comprising:
a first dual-mode optical fiber for receiving a light input and exciting a first spatial mode and a second spatial mode;
a first modal processor connected to said first dual-mode optical fiber for selecting said first spatial mode and said second spatial mode;
a second dual-mode optical fiber connected to said first modal processor for propagating said first spatial mode and said second spatial mode, producing a phase shift ($\Delta\phi$) between said first spatial mode and said second spatial mode in response to an external perturbation effect and producing a first light output interference pattern; and
an analyzer having a polarization axis and connected to said second dual-mode optical fiber for adjusting said first light output interference pattern to produce a second light output interference pattern, so that said second light output interference pattern obtains an optimal contrast through an adjustment of said polarization axis.

22. A fiber-optic interferometer according to claim 21 further comprising a second modal processor connected between said second dual-mode optical fiber and said analyzer for modifying said first light output interference pattern.

23. A fiber-optic interferometer, comprising:
a first dual-mode optical fiber for receiving a light input and exciting a first spatial mode and a second spatial mode, wherein said first and said second spatial modes are a fundamental and a second-order modes of an o-core dual-mode optical fiber respectively;
a first modal processor connected to said first dual-mode optical fiber for selecting said first spatial mode and said second spatial mode; and
a second dual-mode optical fiber connected to said first modal processor for propagating said first spatial mode and said second spatial mode, producing a phase shift ($\Delta\phi$) between said first spatial mode and said second spatial mode in response to an external perturbation effect and producing a first light output interference pattern having a contrast.

24. A fiber-optic interferometer according to claim 23 further comprising an analyzer having a polarization axis and connected to said second dual-mode optical fiber for adjusting said first light output interference pattern to produce a second light output interference pattern and further obtaining an optimal said contrast through an adjustment of said polarization axis.

25. An optical fiber interfering method for a fiber-optic interferometer, comprising steps of:
providing a light;
exciting a first spatial mode and a second spatial mode in response to said light;
selecting and propagating said first and said second spatial modes through an environment having an external perturbation;
producing a phase shift of said first and said second spatial modes in response to said external perturbation and producing a first light output interference pattern;
adjusting said first light output interference pattern for producing a second light output interference pattern having an optimal contrast; and
detecting said optimal contrast of said second light output interference pattern for obtaining said phase shift of said first and said second spatial modes.

* * * * *